United States Patent Office 2,970,969
Patented Feb. 7, 1961

---

2,970,969

AMINATED SILICON PRODUCTS FROM HALOSILICATES

James H. Shultz and Clarence G. Zike, Indianapolis, Ind., assignors to The Richardson Company, Melrose Park, Ill., a corporation of Ohio No Drawing. Filed Dec. 27, 1957, Ser. No. 705,470

16 Claims. (Cl. 260—2)

This invention is concerned with new silicon containing compounds and, more particularly, relates to compounds resulting from a reaction of ammonia or primary amines with a particular class of organic silicon halides.

Ammonia or primary amine derivatives of silicon halides have been disclosed and claimed in a number of patents issued to Nicholas D. Cheronis, one example of which is United States Patent 2,579,418. In this and other Cheronis patents a group of compounds sometimes identified as "silamines" or "aminosilanes," have been disclosed which result from the ammonolysis of organic silicon compounds having the general formula $$R_n SiHal_{4-n}$$

wherein R is hydrogen or an organic group, such as an alkyl, aryl, alkenyl or the like and Hal is a halogen atom attached directly to silicon.

The ammonolysis products of the foregoing compounds in many cases lead to the production of resinous compositions which cure either at room temperature or upon application of heat. These particular compounds have found use in a variety of applications in a manner similar to the somewhat analogous and well-known silicone compounds. Silamines may be used as protective coatings for such base materials as glass, wood and leather, as well as curing agents for epoxy resins, exemplified by the Epon series of resins produced by Shell Chemical Company.

This invention is directed toward a particular class of silamines which are derived from organic silicon compounds of the general type indicated in the above formula but wherein the silicon halides have first been subjected to a reaction with a compound containing an epoxy or oxirane group to form an intermediate halosilicate ester. These esters in turn are then reacted with ammonia or a primary amine to produce the new silamines contemplated by the present invention.

Accordingly, it is the object of this invention to produce new compositions which are ammonia or primary amine derivatives of the reaction product of epoxy compounds with silicon halides.

Another object is the production of compositions of the foregoing type which may be used to form new resinous compositions by themselves or in conjunction with other compositions.

A further object is to produce new compositions of the foregoing type which, either alone or in combination with other compositions, may be used in molding, laminating, film-forming and impregnating operations.

Intermediate halosilicates from which the ammonia or primary amine derivatives of the present invention may be formed are disclosed in the United States patent to Rust, et al. 2,650,934. These halosilicates may be made by reacting silicon tetrahalide or compounds of the general formula:

$$R_n SiHal_{4-n}$$

with compounds containing an epoxy group. The R in the initial silicon halide may be hydrogen or any one of a wide variety of substituent groups, such as alkyl, alkenyl, aryl, alkaryl, alkoxy, aroxy, etc. Further, the initial silicon halide may actually comprise a mixture of two different silicon halides in that, for example, one of the halides might be of the alkyl type, such as methyl silicon trichloride, while the other is of the aryl type such as phenyl silicon trichloride.

The epoxy reactant likewise may be selected from a variety of known compounds, for example, ethylene oxide, epichlorohydrin, butadiene dioxide, styrene oxide and phenyl glycidyl ether all of which are characterized by having the reactive epoxy group

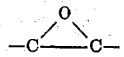

As indicated in the patent to Rust, a reaction between an epoxy compound and a silicon halide occurs with ease to the extent that the resultant products can be readily formed without difficulty and with little or no by-products being produced. A typical example of such a reaction is given below involving ethylene oxide and silicon tetrachloride.

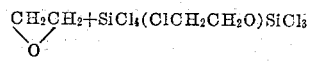

As Rust discloses, a complete reaction, involving displacement of all of the chlorine on the silicon atom, may take place if sufficient epoxy compound is employed. However, he also points out that numerous intermediates may be formed, containing varying amounts of beta-haloalkoxy groups and halide atoms, by controlling the ratio of epoxide to silicon tetrahalide in the reaction mixture. It is the intermediates with which the present invention is concerned for the reason that it is necessary to have at least one chlorine remaining attached to the silicon atom in order to provide for the subsequent desired reaction with ammonia or a primary amine. If sufficient epoxy reactants were used so as to react with all the chlorine initially attached to the silicon atom, there would be no chlorine available for subsequent reaction with ammonia or primary amine under the conditions contemplated, hence, the requirement that the reaction between the epoxy compound and the silicon halide be controlled so as to insure that at least one chlorine atom remains attached directly to silicon.

After formation, the intermediate halosilicate is then reacted with ammonia or primary amine, in either a liquid or gaseous form, to produce silamines somewhat similar in nature to those disclosed in the aforementioned Cheronis patents.

The number of chlorine atoms which remain in the intermediate halosilicate will directly affect the product which results from an ammonolysis or aminolysis reaction. If two chlorine atoms remain attached to silicon in the intermediate halosilicate, the intermediate halosilicate and the resultant ammonolysis or aminolysis product can be referred to as "difunctional." Such difunctional products are capable of further reaction to form trimers and tetramers, generally cyclic in structure, oily in nature and usually not curable, at least at moderately elevated temperatures, to a hardened state.

If the intermediate halosilicate contains three chlorine atoms attached to silicon and, hence, available for further reaction with ammonia, the intermediate halosilicate and resultant ammonolysis product may be referred to as "trifunctional." Ammonolysis products which are trifunctional have in general been found to form resinous materials readily curable to at least a partially hardened state at room temperature or slightly above.

It is possible to form a product which is a mixture of ammonia or primary amine derivatives of halosilicates by initially starting with a mixture of silicon halides as previously indicated. In addition, it is also possible to ammonolyze or aminolyze a mixture of intermediate halosilicates, such as a mixture formed from haloalkoxy silicon dihalide and trihalide.

The ammonolysis or aminolysis reaction should be conducted in the substantial absence of water in order to prevent hydrolysis of the intermediate halosilicate.

The epoxide is, preferably, first dissolved in a suitable inert solvent such as benzene and this solution introduced into a similar solution of the silicon halide. The step of forming the intermediate halosilicate may be accelerated if desired, by application of heat. The resultant halosilicate in solution can then be reacted with ammonia, for example, either as a liquid or as a gas, the reaction proceding readily until all of the chlorine attached to the silicon in the intermediate halosilicate has been eliminated in the form of ammonium chloride. The ammonolysis or aminolysis may take place at ordinary pressures but preferably at low temperatures or may be conducted under superatmospheric pressures.

If the resulting reaction product is trifunctional, such a product, in general, should be kept in solution with the solvent until it is to be used to prevent prepolymerization at room temperature.

In addition to ammonia, various primary amines may be used in the reaction including ethylamine, propylamine, benzylamine, as well as other amines such as those cited in the Cheronis patents.

For purposes of illustrating the principles of the invention but not intending to otherwise limit the same, the following examples are presented.

Example 1

Sixty gms. of phenyl glycidyl ether dissolved in 100 ml. of hexane and 34 gms. of silicon tetrachloride dissolved in 100 ml. of hexane (2 mols of phenyl glycidyl ether to 1 mol of $SiCl_4$) were added slowly through separate necks of a three necked flask containing 100 ml. of hexane while stirring. The temperature rose to 68° C. and bubbling occurred. External cooling with cold water was used to lower the reaction temperature to 57° C. After the mixture cooled, enough hexane was added to make ½ gallon of solution. The halosilicate solution was slowly dripped into a Dewar flask containing 1 liter of liquid ammonia. The excess ammonia was stripped; filtration yielded 33 gms. of residue. The filtrate was stripped until most of the solvent was eliminated. Thirty-eight gms. of a thick gummy resin were obtained. Considerable residue was left in the Dewar flask. This residue subsequently cured at room temperature to a tough composition.

Ten gms. of the resin obtained in the above example were mixed with 30 gms. of Shell Epon 828 epoxy resin. When heated in the oven the mixture bubbled and gave off ammonia gas. The sample was heated to 130° C. overnight but did not cure. When the oven was raised to 245° C., the sample cured to a hard resin.

Example 2

Twenty gms. of ethylene oxide were dissolved in 100 gms. of anhydrous methylal and 84 gms. of silicon tetrachloride were mixed with 100 gms. of methylal. Approximately 250 ml. of methylal was placed in a three necked flask and the reactants added slowly through separate necks. The mixture was stirred for one hour. The resulting beta chloroethoxy silicon trichloride was ammonolyzed in a manner similar to Example 1. A voluminous precipitate was formed. After filtration and solvent stripping, approximately 30 ml. of liquid remained. Upon exposure to air in a thin layer, it cured readily to a brittle film that could be easily crumbled.

A 50/50 mixture of the above product with Shell's Epon 828 epoxy resin cured to a hardened condition when heated to 200° C.

Example 3

Forty-four gms. of liquid ethylene oxide were dissolved in 100 gms. of methylal. Eighty-four gms. of silicon tetrachloride were mixed with 100 gms. of methylal and placed in a three necked flask containing a stirrer and reflux condenser. The ethylene oxide solution was slowly introduced by means of a separatory funnel. When the ethylene oxide solution was added the mixture turned pink and the reaction temperature rose to approximately 45° C. The pink color finally disappeared and with constant stirring the reaction temperature was still at the boiling point of methylal after one hour. Anhydrous methylal was added to bring the total volume up to one liter. One half liter of liquid ammonia and 1 liter of methylal were placed in a Dewar flask and the halosilicate solution slowly dripped into it with constant stirring. The reaction was similar to that described for the preparation of silamines. After the ammonia was boiled off and the liquid filtered, it was necessary to add about 1.5 liters of hexane to precipitate a white haze in the solution. After the solvent was boiled off, approximately 90 ml. of a low viscosity oily liquid was obtained weighing 81 gms. Five gms. of the oily composition were then mixed with 15 gms. of Shell Epon 828 epoxy resin. Upon raising the temperature to 200° C. a hard product was obtained.

Example 4

A benzene solution containing 84 gms. of $SiCl_4$ was placed in a three necked flask. About half of a phenyl glycidyl ether-benzene solution containing 113 gms. of phenyl glycidyl ether was dripped into the flask with constant stirring. The temperature rose to 80° C. and remained at this level for approximately 20 minutes. The remainder of the phenyl glycidyl ether solution was then introduced, the temperature again rising to 70° C. After 1½ hours, the temperature returned to approximately 35° C. The halosilicate reaction product after isolation was mixed with anhydrous methylal to make 1 liter of solution.

One-half liter of liquid $NH_3$ in a Dewar flask was mixed with 1.5 liters methylal. The halosilicate solution was then slowly dripped into the ammonia solution with constant stirring. After the $NH_3$ was stripped, the solution was filtered and the resulting clear filtrate was stripped of solvent. A moderately viscous liquid was obtained; weight, 185 gms.

Example 5

Seventy-five gms. of phenyl glycidyl ether were dissolved in 100 gms. of benzene and added slowly with stirring to eighty four gms. of $SiCl_4$ dissolved in 100 gms. of benzene, in a three-necked flask. After all of the phenyl glycidyl ether was added, heat was applied to maintain a temperature of 50° C. for one hour. The stirring was stopped and the solution permitted to stand for about 12 hours. The resulting halosilicate was diluted with anhydrous methylal to make one liter and was mixed with a solution comprising ⅓ liter of liquid $NH_3$ and 1 liter methylal. The precipitate was filtered and the clear solution boiled until the solvent was gone. Approximately 120 ml. of trifunctional silamine resin were obtained.

Ten grams of the silamine resin were mixed with 30 grams of Shell's Epon 828 epoxy resin. The mixture was placed in an oven at 150° C. and cured to a hardened state.

Example 6

Fifty-seven grams of allyl glycidyl ether in 100 gms. of benzene was added to eighty-four gms. of $SiCl_4$ in 100 gms. of benzene as in the above examples. The resulting chloroalkoxy silicontrihalide was then ammonolyzed with liquid ammonia. About 90 ml. of a viscous liquid was obtained. Ten gms. of this liquid product were mixed with 20 gms. of Shell's Epon 828 epoxy resin. Upon heating, a clear, bubble-free, cured resin was obtained.

Example 7

A solution of 75 grams of styrene oxide in 100 gms. benzene was added dropwise to 84 gms. of SiCl$_4$ in 100 gms. of benzene (molar ratio of styrene oxide to SiCl$_4$, 1.25 to 1). The resulting halosilicate was then ammonolyzed with liquid ammonia.

After processing, as described in the preceding example, 10 gms. of the liquid silamine were mixed with 20 gms. of Shell's Epon 828 epoxy resin and placed in an oven and the temperature raised until the mixture cured to a hardened state.

Example 8

One hundred and sixty-four gms. of methylsilicon trichloride in 100 gms. of benzene were reacted with a solution of 133 gms. of styrene oxide in 100 gms. of benzene. The resulting 2 phenyl 2 chloroethoxysiliconchloride, in solution, was permitted to stand overnight, diluted by the addition of benzene and slowly added to a Dewar flask containing 1 liter of liquid ammonia. Excess liquid ammonia was then boiled off and the reaction mixture filtered. The solvent present with the filtrate was removed by boiling yielding a yellow viscous, oily material. A sample of this product was heated on a watch glass in an oven at 100° C. overnight resulting in the formation of a surface film.

The epoxy composition identified as Shell's Epon 828 epoxy resin is the product of reaction of Bisphenol A with epicholorohydrin.

Epoxy compounds containing single epoxy or oxirane groups are preferably used in introducing substitutent groups into the silicon halide for the reason that such a reaction is more easily controlled. Compounds containing two epoxy groups may, however, be used in forming the intermediate halosilicates. In such an event it is important that the initial reaction mixture be carefully prepared and that the appropriate molar ratios are present to avoid the possibility of forming unreactive resinous materials rather than intermediate halosilicates which can be further reacted with ammonia or primary amine.

In our co-pending application S.N. 670,631, filed July 9, 1957, there have been disclosed and claimed broadly the reaction products of ammonolyzed halosilicates of this invention and analogous ammonolyzed compounds with compounds containing an epoxy or oxirane group.

Having described certain exemplary embodiments of the invention the same is only intended to be limited by the scope of the following claims.

We claim:

1. A process for making an aminated silicon compound which consists of reacting: (1) a member of the group consisting of ammonia and a monovalent hydrocarbon primary amine with (2) the halosilicate formed by reacting an epoxy compound from the class consisting of ethylene oxide, epichlorohydrin, allyl glycidyl ether, butadiene dioxide, styrene oxide and phenyl glycidyl ether with a silicon halide from the group consisting of alkyl trihalosilane, aryltrihalosilane and silicon tetrahalide wherein said halosilicate contains at least one halogen atom attached to silicon.

2. The aminated silicon product of the process of claim 1.

3. A process as described in claim 1 wherein the silicon halide is methyltrichlorosilane.

4. The aminated silicon product of the process of claim 3.

5. A process as described in claim 1 wherein the silicon halide is phenyltrichlorosilane.

6. The aminated silicon product of the process of claim 5.

7. A process as described in claim 1 wherein the silicon halide is silicon tetrachloride.

8. The aminated silicon product of the process of claim 7.

9. A process of making an aminated silicon compound which consists of reacting: (1) ammonia with (2) the halosilicate formed by reacting ethylene oxide with a silicon halide from the group consisting of alkyltrihalosilane, aryltrihalosilane and silicon tetrahalide wherein said halosilicate contains at least one halogen atom attached to silicon.

10. The aminated silicon product of the process of claim 9.

11. A process of making an aminated silicon compound which consists of reacting: (1) ammonia with (2) the halosilicate formed by reacting styrene oxide with a silicon halide from the group consisting of alkyltrihalosilane, aryltrihalosilane and silicon tetrahalide wherein said halosilicate contains at least one halogen atom attached to silicon.

12. The aminated silicon product of the process of claim 11.

13. A process of making an aminated silicon compound which consists of reacting: (1) ammonia with (2) the halosilicate formed by reacting phenyl glycidyl ether with a silicon halide from the group consisting of alkyltrihalosilane, aryltrihalosilane and silicon tetrahalide wherein said halosilicate contains at least one halogen atom attached to silicon.

14. The aminated silicon product of the process of claim 13.

15. A process for making an aminated silicon compound which consists of reacting ammonia with the halosilicate formed by reacting ethylene oxide and silicon tetrachloride wherein said halosilicate contains at least one chlorine atom attached to silicon.

16. The aminated silicon product of the process of claim 15.

References Cited in the file of this patent

UNITED STATES PATENTS

| | | |
|---|---|---|
| 2,579,418 | Cheronis | Dec. 18, 1951 |
| 2,650,934 | Rust et al. | Sept. 1, 1953 |